United States Patent
Thornton

[11] Patent Number: 6,076,847
[45] Date of Patent: Jun. 20, 2000

[54] TRAILER HITCH ALIGNMENT DEVICE

[76] Inventor: Morris E. Thornton, 940 SW. 21st La., Boca Raton, Fla. 33486

[21] Appl. No.: 09/140,167

[22] Filed: Aug. 26, 1998

[51] Int. Cl.[7] .................................................. B60D 13/00
[52] U.S. Cl. ........................................... 280/477; 359/872
[58] Field of Search ................................ 280/656, 414.1, 280/477; 359/871, 872

[56] References Cited

U.S. PATENT DOCUMENTS

| D. 344,485 | 2/1994 | Linne et al. ........................ 359/871 X |
| 3,858,966 | 1/1975 | Lowell, Jr. .......................... 280/477 X |
| 4,583,481 | 4/1986 | Garrison ............................. 280/477 X |
| 4,905,376 | 3/1990 | Neeley ................................ 280/477 X |
| 5,180,182 | 1/1993 | Haworth ............................. 359/872 X |
| 5,328,199 | 7/1994 | Howe ..................................... 280/477 |
| 5,482,310 | 1/1996 | Staggs ................................... 280/477 |
| 5,657,175 | 8/1997 | Brewington ........................... 359/872 |
| 5,680,706 | 10/1997 | Talcott .............................. 280/477 X |
| 5,979,927 | 11/1999 | Hale ..................................... 280/477 |

FOREIGN PATENT DOCUMENTS 2601527   7/1977   Germany ............................... 280/477

Primary Examiner—Brian L. Johnson
Assistant Examiner—Bryan Fischmann
Attorney, Agent, or Firm—Robert M. Downey, P.A.

[57] ABSTRACT

An elongate post removably supported on a towed vehicle and extending upwardly therefrom; a traveler removably fitted to the post and movably positionable along a length thereof throughout a range of fixed, adjusted positions and including opposing arm members surrounding and gripping the post when in a relaxed state to thereby hold the traveler fixed to the post at the adjusted positions, and the arm members being structured to be urged outwardly from the relaxed state to release the grip, thereby permitting sliding movement of the traveler along the post; and a mirror device pivotally fitted to the traveler member and being angularly adjustable for positioning the mirror in a manner which presents a reflected image of a hitch component on the towed vehicle viewable by the operator in the rear view mirror of a towing vehicle, to thereby allow the operator to maneuver the towing vehicle so that a hitch component on the towing vehicle moves toward and into alignment with the hitch component on the towed vehicle, facilitating attachment thereof.

6 Claims, 3 Drawing Sheets

700
TRAILER HITCH ALIGNMENT DEVICE

BACKGROUND OF THE INVENTION

1. Field of the Invention

The present invention relates to a trailer hitch alignment device and, more particularly, to a trailer hitch alignment device having a mirror adjustably supported on a post extending upwardly from a tongue of a trailer to be towed by a towing vehicle, wherein an image of the hitch component on the trailer is viewable by the operator of the towing vehicle when maneuvering the towing vehicle towards the trailer in order to align the hitch components for subsequent attachment.

2. Background of the Invention

Hitch assemblies for mechanically interconnecting a trailer or the like to the rear of a motor vehicle are common and well known in the art. Typically, a trailer hitch assembly includes a first hitch component mounted to the rear bumper of the motor vehicle and a second hitch component on a forwardly extending tongue of a trailer, or other wheeled vehicle to be towed. A common type of hitch assembly is known as the ball and socket type hitch, wherein a spherical ball element is mounted to the bumper or rear frame structure of the motor vehicle and a socket structured for interlocking receipt of the ball is footed to the tongue of the trailer.

A problem is commonly encountered by operators of towing vehicles when maneuvering the towing vehicle in reverse, towards the trailer, in order to vertically align the respective trailer hitch components on the rear of the vehicle and the forwardly extending tongue of the trailer. By maneuvering the vehicle so that the trailer hitch component on the rear bumper is closely adjacent and vertically aligned with the hitch component on the trailer, the tongue of the trailer can then be manually manipulated, a short distance, so that the socket is vertically aligned with the ball. Thereafter, the trailer tongue can be lowered so that the ball is received into the socket and mechanical interconnection can be completed.

The most common approach to complete alignment and attachment of trailer hitch components on a towing vehicle and a trailer is to have a person stand near the tongue of the trailer and to verbally direct the operator of the towing vehicle, shouting out instructions to the vehicle operator, in order to guide the ball hitch component towards the socket on the tongue of the trailer. Unfortunately, a second person is not always readily available to assist the vehicle operator. Furthermore, the assisting person's instructions are not always accurate or easy to understand, causing frustration and anger as attempts to align the hitch components fail.

Others in the art have proposed target systems, wherein a first target is supported on a vertical pole above the socket hitch component on the trailer and a second target is fitted to the end of a vertical pole extending upwardly from the ball component on the rear of the vehicle. Typically, the targets are round objects, such as tennis balls. Others have proposed mirror devices for reflecting an image of the hitch component on the trailer to driver of the vehicle. While these devices are more closely related to the present invention have been found to be somewhat effective, those known in the art are cumbersome, awkward and difficult to install. Further, the various mirror trailer hitch alignment devices known in the art are not readily adaptable to a wide variety of trailer and vehicle models and sizes. Of particular significance is the optical target system disclosed in U.S. patent to Johnson, U.S. Pat. No. 5,309,289 which shows a mirror supported on a mounting bracket, including an elongate bar fixed to the mirror and adjustably attached to a vertical bar 39 of a support standard mounted on the trailer. The mounting hardware, including the support standard and bracket structure, is cumbersome, and specifically designed for a particular style trailer. Further, the large number of components of hardware in the Johnson system make it difficult to install and costly to manufacture.

Another mirror type device for aligning the components of a trailer hitch is shown in the U.S. patent to Brewington, U.S. Pat. No. 5,657,175. This device consists of a pair of spaced, parallel arm members mounted to the rear door of a pick-up truck, and having a mirror pivotally supported therebetween. The mirror is positionable at an angle which enables the driver to view reflected images of the trailer hitch component on the trailer and rear bumper of the vehicle, while looking in the rear view mirror of the vehicle. While this device may be effective to align the complimentary components of a trailer hitch, it is generally limited to specific vehicle designs, primarily a pick-up truck. Further, the Brewington device is rather cumbersome and unsightly, having an industrial design, making it generally undesirable for use on non-commercial vehicles. Further, mirror type trailer hitch alignment devices, including those to Johnson and Brewington, are not adapted for ease of removal once the trailer hitch components are attached. This exposes the devices to theft and damage during operation of the motor vehicle, including shattering of the mirror from impact of projectiles such as stones and other debris kicked up and thrown towards the mirror from the rear wheels of the towing vehicle.

SUMMARY OF THE INVENTION

The present invention relates to a trailer hitch alignment device for visually assisting an operator of a towing vehicle in maneuvering the towing vehicle in order to align a first trailer hitch component on a rear of the towing vehicle with a second trailer hitch component on a vehicle to be towed.

The trailer hitch alignment device includes an elongate post which removably mounts to the towed vehicle so that the post extends upwardly therefrom. A traveler member is slidably fitted to the post and is adjustable throughout a range of fixed positions along a length of the post. A mirror is pivotally fitted to the traveler member so as to be angularly adjustable throughout a range of motion in excess of a 90° arc. In use, the mirror is first positioned at an appropriate height (level above the trailer hitch components) so as to be easily viewable by an operator of the towing vehicle when looking in the rear view mirror of the towing vehicle. The mirror of the trailer hitch alignment device, once adjusted to the appropriate height, is then angularly positioned so that an image of the second trailer hitch component on the towed vehicle is reflected towards the operator and viewable in the rear view mirror. In this manner, a target is provided, allowing the operator to maneuver the towing vehicle so that the first trailer hitch component moves towards and into alignment with the second trailer hitch component. Once in proper alignment, the forwardly extending tongue of the trailer can be lowered so that the second trailer hitch component engages the first trailer hitch component, facilitating mechanical, locked engagement thereof.

In one preferred embodiment, the device includes an attachment socket on the towed vehicle, rearward of the second trailer hitch component. The socket is specifically structured for removable, attached receipt of a bottom end of the post therein. Attachment of the bottom end of the post within the socket is achieved with the use of one or more set screws or magnets.

In a second preferred embodiment of the present invention, the post is slidably fitted within an upwardly angled stanchion on the towed vehicle. The post is telescopically adjustable throughout a range of extended positions relative to the stanchion, to thereby facilitate selective adjustment of a height of the top end of the post relative to the second trailer hitch component, as well as the eye level of the operator of the towing vehicle. Various means may be provided for releasable locking of the post at fixed, adjusted positions. When not in use, the traveler member and mirror can be removed from the post allowing the post to be slidably received within the stanchion to assume a stowed position.

To further assist the operator of the towing vehicle in aligning the trailer hitch components, vertical and horizontal alignment aids may be provided on the rear window of the towing vehicle. The vertical and horizontal alignment aids, resembling cross hairs, provide a reference to the operator, indicating the position of the second trailer hitch component relative to the first trailer hitch component. The center of the cross hairs (intersection of the vertical and horizontal alignment aids) indicates a location of the first trailer hitch component on the rear of the towing vehicle when the first and second trailer hitch components are attached. In other words, when the first and second trailer hitch components are attached, an image of the first trailer hitch component is visible in the mirror of the device at the intersection of the vertical and horizontal alignment aids on the rear window of the towing vehicle.

OBJECTS AND ADVANTAGES OF THE INVENTION

It is a primary object of the present invention to provide a trailer hitch alignment device for visually assisting an operator of a towing vehicle and maneuvering the towing vehicle in order to align a first trailer hitch component on the rear of the towing vehicle with a second trailer hitch component on a vehicle to be towed.

It is a further object of the present invention to provide a trailer hitch alignment device, as described above, which is easy to install and can be quickly disassembled for stowage when not in use.

It is a further object of the present invention to provide a trailer hitch alignment device, as described above, which includes an elongate post and a mirror slidably adjustable along a length of the post, wherein means are provided for selective positioning of the mirror along a length of the post as well as adjusted, angular positioning of the mirror relative to the trailer hitch component on the towed vehicle.

It is yet a further object of the present invention to provide a trailer hitch alignment device, as described above, wherein the mirror can be quickly and easily removed from the elongate post for stowage when not in use.

It is still a further object of the present invention to provide a trailer hitch alignment device, as described above, wherein the elongate post is removably attachable to the towed vehicle using either thumb screws or magnetic means.

It is yet a further object of the present invention to provide a trailer hitch alignment device, as described above, wherein the elongate post is slidably received within a stanchion of the towed vehicle so as to be telescopically extendable therefrom throughout a range of positions of adjusted length.

It is still a further object of the present invention to provide a trailer hitch alignment device, as described above, wherein the mirror is formed of plastic, thereby enhancing the safety and durability of the device.

These and other objects and advantages of the present invention will be readily apparent when referring to the following detailed description and the accompanying drawings.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Referring to the several views of the drawings, the various embodiments of the present invention directed to a trailer hitch alignment device are illustrated wherein the device is generally indicated as 10.

Figure 1:
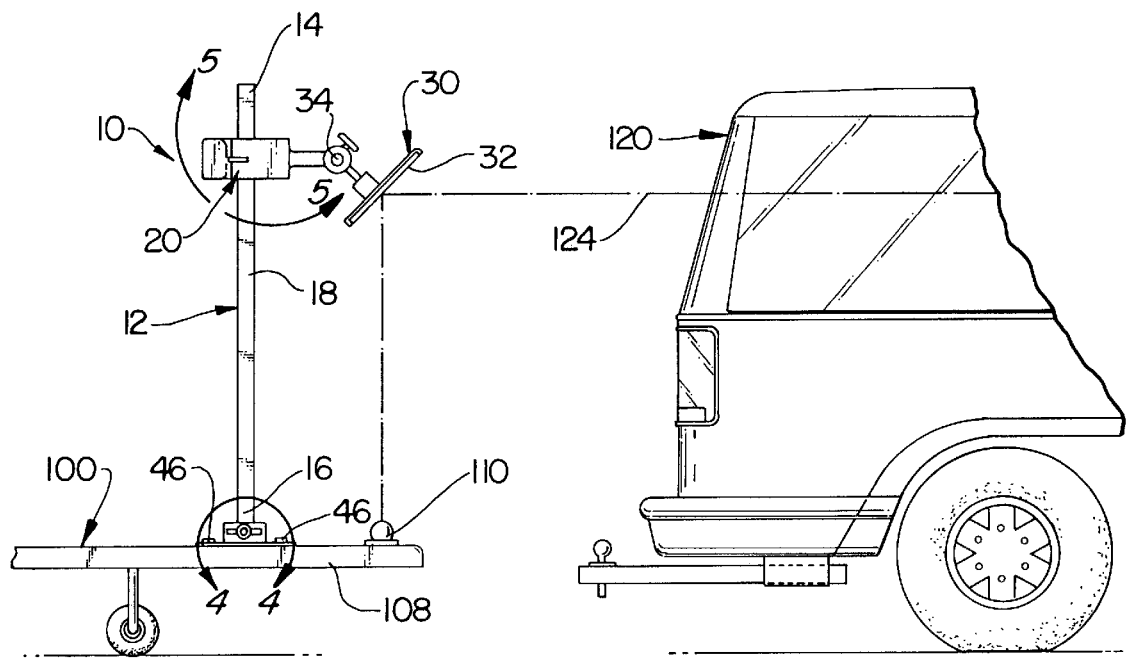
FIG. 1 is a side elevation showing the trailer hitch alignment device fitted to a trailer positioned behind a towing vehicle having a trailer hitch component on the rear bumper thereof.

Referring initially to FIG. 1, the device 10 is shown in accordance with a first preferred embodiment thereof and includes an elongate post 12 removably attachable to a vehicle to be towed 100, such as a trailer. The post 12 includes a top end 14, a bottom end 16 (see FIGS. 3, 4A and 4B) and a length 18 extending between the top and bottom ends and defining an elongate track for accommodating a traveler 20. The bottom end 16 is removably attachable to the towed vehicle 100, rearward of a hitch component 110 on the towed vehicle, using various means as shown in FIGS. 1–4B.

The traveler 20 is removably fitted to the post 12 and is slidable along the length 18 to facilitate selective, adjustable positioning of the traveler 20 on the post. The traveler 20 includes clamp means for releasably fixing the traveler 20 at any of the selected, adjusted positions on the post 12.

A mirror assembly 30 pivotally attaches to the traveler 20 and includes a plastic reflecting mirror 32 on a main face thereof. The mirror 32 may be either flat or convex and may be structured and configured to provide a dual optics feature. The mirror assembly 30 is adjustable about a pivot 34 throughout a range of motion in excess of 90° relative to the traveler 20 so as to permit adjusted, locked positioning of the mirror assembly 30 and mirror 32 at a position which reflects an image of the hitch component 110 through the rear window of a towing vehicle 120 and within the line of sight of the operator of the towing vehicle 120 while looking in the towing vehicle's rear view mirror, as indicated by the broken line 124 in FIGS. 1 and 2. It, therefore, can be appreciated and understood that the operator of the vehicle 120 is able to maneuver the towing vehicle 120 in a reverse direction while viewing the hitch component 110 so that the operator can guide and direct a hitch component 122 on the rear of vehicle 120 towards hitch component 110 on the towed vehicle 100 until the hitch components 110, 122 are disposed in alignment for subsequent interconnection. To further assist the operator of the towing vehicle 120, the rear window of the towing vehicle may be provided with vertical and horizontal alignment guides, such as cross hairs, wherein the center (i.e., intersection of a vertical line and a horizontal line) represents the location of the hitch component 122, as reflected from the mirror 32 through the rear window when the hitch components 110, 122 are in proper alignment for attachment. These alignment guides can thus be affixed to the rear window when the hitch components 110, 122 are attached, while the operator is viewing the mirror 32 in the rear view mirror of the towing vehicle 120. The operator can then instruct an assistant to place a vertical line on the rear window of the vehicle 120 so that the vertical line is in alignment with the hitch component 122 as viewed by the operator while looking in the rear view mirror. Similarly, the assistant will be instructed to place the horizontal line, perpendicular to the vertical line, on the rear window so that the two lines intersect at the location where the hitch component 122 is visible to the operator, along the line of sight as indicated by the broken line 124 in FIGS. 1 and 2.

Figure 4A:
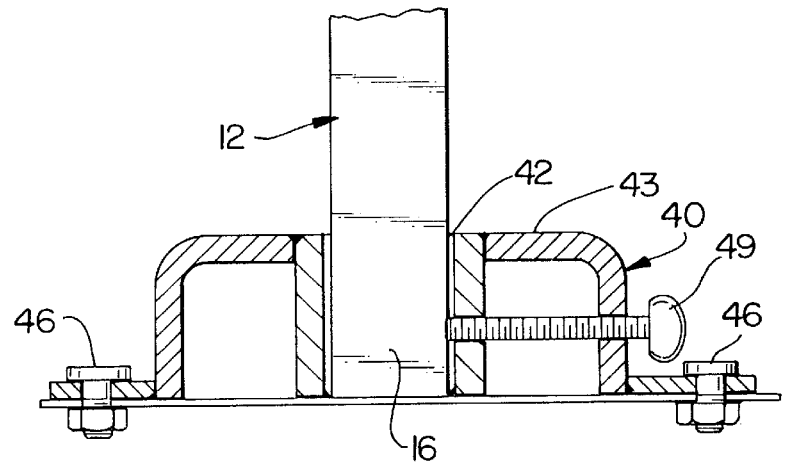
FIG. 4A is an isolated view, in partial section, taken from an area indicated as 4 in FIG. 1 illustrating removable attachment of a bottom end of the elongate post within a socket mounted to the trailer or towed vehicle, in accordance with one embodiment thereof.
Figure 4B:
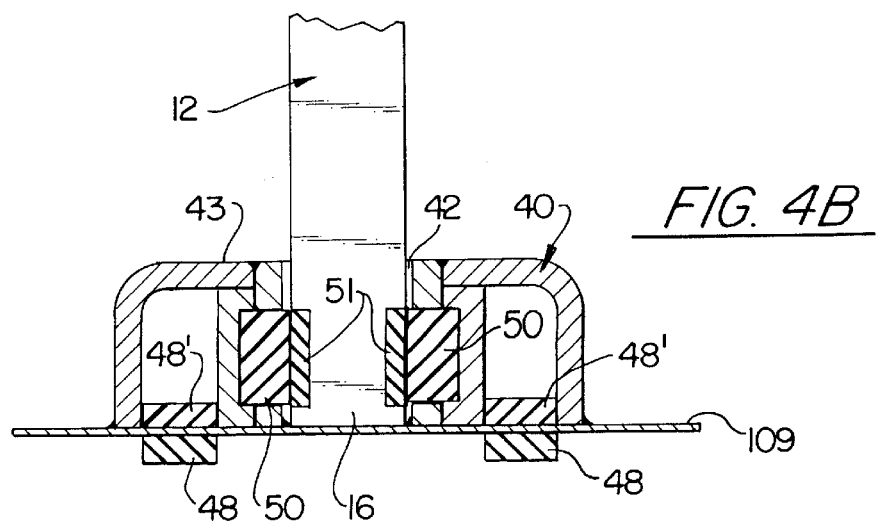
FIG. 4B is an isolated view, in partial section, taken from an area indicated as 4 in FIG. 1 illustrating removable attachment of a bottom end of the elongate post within a socket mounted to the trailer or towed vehicle.

Referring now to FIGS. 4A and 4B, means for removably supporting the post 12 in a generally upwardly extending position (as seen in FIG. 1) are shown in accordance with several embodiments thereof. The means for removably supporting the post, in each embodiment, include a socket element 40 having a central channel 42 extending downwardly through a top side 43 thereof. The channel 42 is specifically sized and configured for congruent, removable receipt of the bottom end 16 of the post 12 therein so that the socket 40 generally surrounds the last two to four inches of the post 12 at the bottom end 16. The socket 40 can be mounted to the towed vehicle 100, such as on a forwardly extending tongue portion 108 of a trailer 100 using various means, including bolts or screws 46 (see FIGS. 1 and 4A) or correspondingly aligned magnets 48, 48' (see FIG. 4B) in the socket 40 and the tongue 108 of the trailer 100. It should be noted that magnet 48 within the tongue of the trailer may not be needed if the magnets 48' in the socket 40 are sufficient to magnetically attach the socket 40 to the top surface 109 of the trailer or towed vehicle 100. The bottom end 16 of the post 12 is secured and locked into place within the channel 42 of the socket 40 using various means. In one embodiment, one or more set screws 49 may be provided through the thickness of the socket 40 so that a distal end of the set screws 49 engages an outer surface of the lower of the bottom end portion 16, in frictional engagement therewith. In other embodiment, as seen in FIG. 4B, magnets 50 are provided within the socket 40, along the channel 42, adjacent the sides of the bottom end portion 16 of the post 12. Additional magnets 51 may be provided on the bottom end portion 16 of the post 12 for corresponding magnetic attraction with the magnets 50. Thus, various means of attachment in one embodiment are shown in FIGS. 4A and 4B for removably supporting the post 12 on the towed vehicle 100, such as the tongue 108, so that the post extends upwardly therefrom, as seen in FIG. 1.

Figure 2:
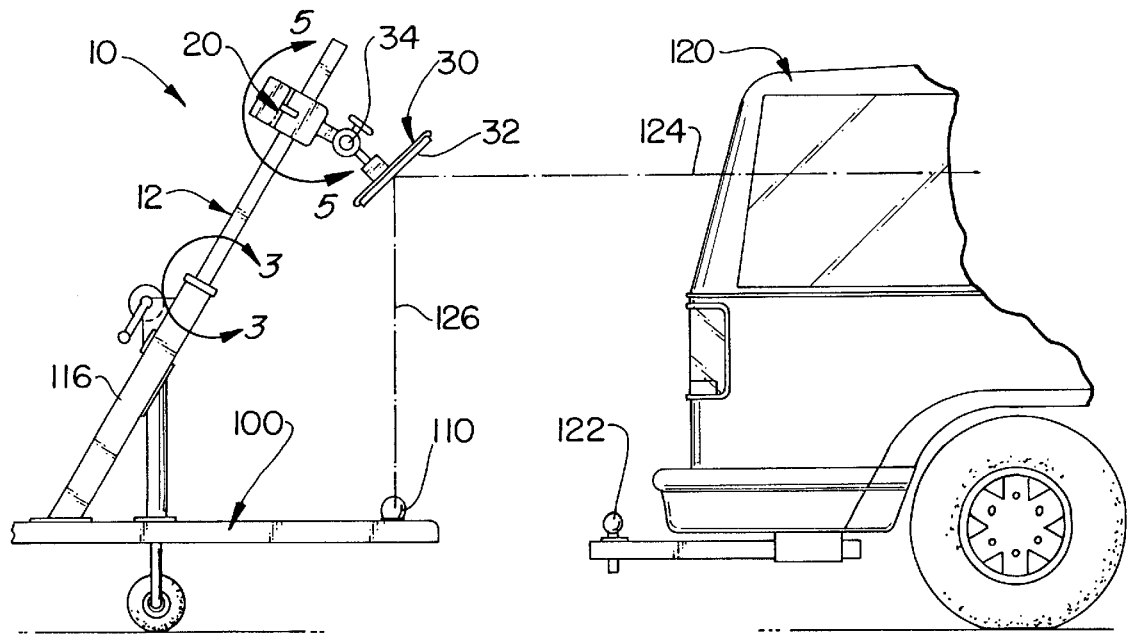
FIG. 2 is a side elevation, similar to FIG. 1, illustrating another preferred embodiment of the trailer hitch alignment device of the present invention.
Figure 3:
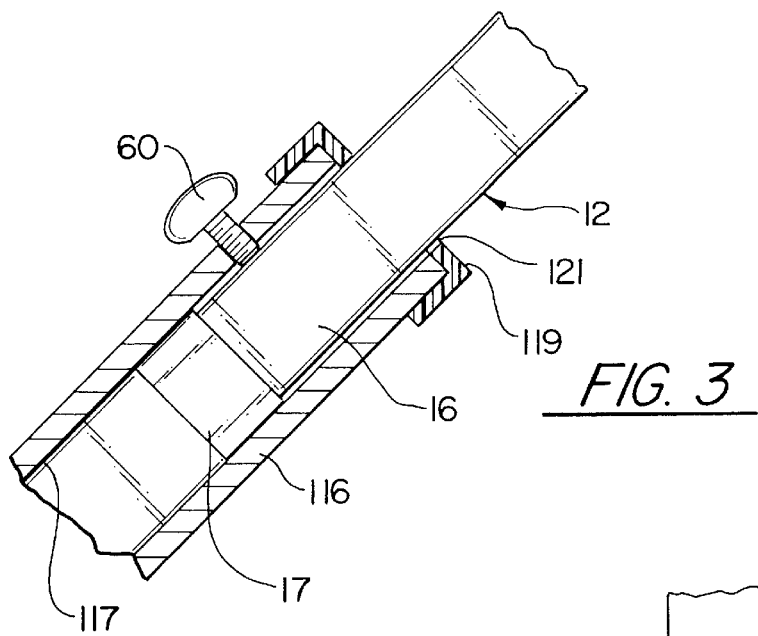
FIG. 3 is an isolated view, in partial section, taken from the area indicated as 3 in FIG. 2.

Referring to FIGS. 2 and 3, another embodiment of means for removably supporting the post on the towed vehicle are shown. In this embodiment, the post 12 is slidably received within a stanchion 116 on the trailer 100. The stanchion 116 is of the type commonly found on a conventional trailer, such as a boat trailer, and extends upwardly, at an angle, from the chassis of the trailer as seen in FIG. 2. The stanchion 116 is hollow and is of a larger cross-section than the post 12. The hollow interior of the stanchion 116 defines a channel for sliding receipt of the post 12 therein, permitting the post 12 to be telescopically extended from a fully collapsed position to a fully extended position. In the collapsed position, the length of the post 12 is received within the stanchion 116 so that only the top end 14 extends outwardly from the top of the stanchion. Prior to moving the post 12 to the collapsed position, the traveler 20 and mirror assembly 30 would be removed from the post and stowed either in the towing vehicle or towed vehicle. In use, the post is extended so that the traveler 20 and mirror assembly 30 can be positioned at a height generally along the eye level 124 of the vehicle operator when seated in the towing vehicle. Further, the height of the post 12 must be sufficient so that the mirror 32 can be positioned vertically above the hitch component 110, as indicated by line 126 in FIG. 2. Once the post 12 is at the desired extended length, one or more set screws 60 are tightened so that a distal end of the set screw engages a side of the bottom end of the post within the stanchion. The bottom distal end of the post 12 may be fitted with a cap 17 which is sized and configured for sliding engagement with an inner surface 117 of the stanchion 116, thus preventing wobbling or rattling of the post 12. To further stabilize the post 12 within the stanchion 116, a cap 119 is fitted to an end of the stanchion 117. The cap 119 includes an opening 121 sized and configured for sliding engagement with an outer surface of the post 12, leaving a minimal amount of clearance sufficient to permit sliding movement of the post 12 therethrough while preventing wobbling or rattling thereof.

Figure 5:
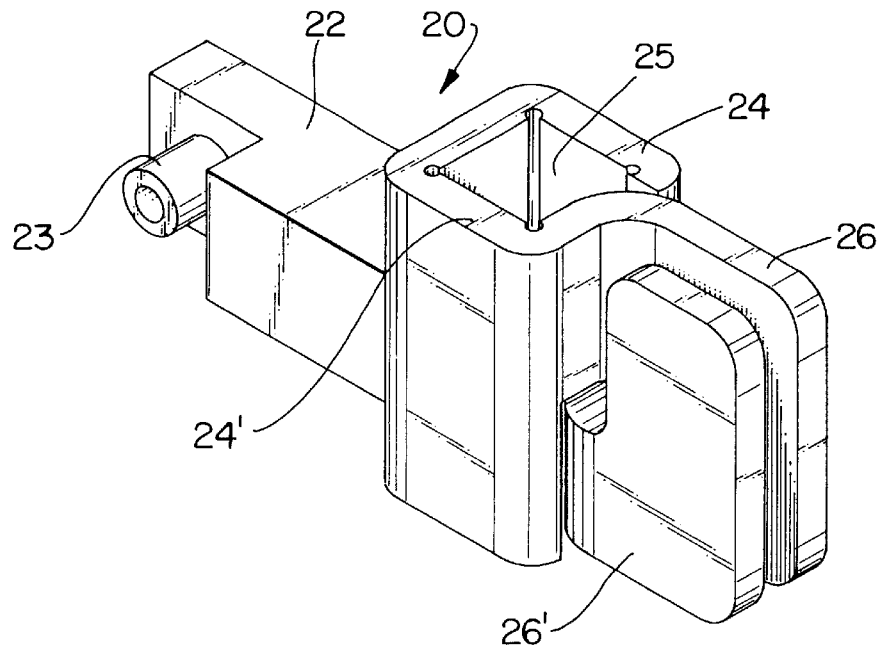
FIG. 5 is an isolated, perspective view of a traveler member of the device.

The traveler 20 is shown in more detail in FIG. 5 and includes a mirror mount extension 22 with a pivot mount member 23 thereon. The traveler 20 further includes opposing arm members 24, 24' extending about a central opening 25 sized and configured for sliding receipt of the post 12 therethrough. The arm members 24, 24' cross each other and extend outwardly to plate members 26, 26'. In a relaxed state, the arm members 24, 24' engage the outer surface of the post 12, with the central opening 25 assuming a reduced size, thereby causing the arm members to grip the post and maintain the traveler 20 in fixed position thereon. To move the traveler 20 along the post to either adjust the position or to remove the traveler from the post, the plate members 26, 26' are squeezed towards one another, thereby urging the arm members 24, 24' outwardly, about the opening 25, enlarging the opening 25 and releasing the grip on the post. While maintaining the plate members 26, 26' squeezed together, the traveler 20 can be slidably moved along the length of the post and/or removed from the top end 14.

Figure 6:
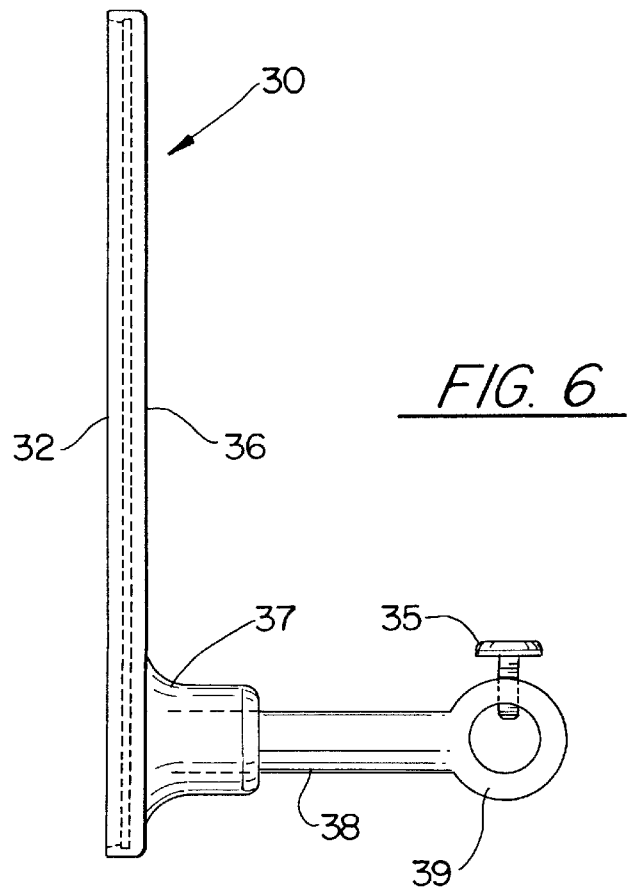
FIG. 6 is a side elevation of a mirror component of the trailer hitch alignment device.

The mirror assembly 30 is shown in FIG. 6 and includes a mirror housing 36 for holding and supporting the mirror 32. A socket 37 protruding from a rear side of the housing 36 supports a mounting arm 38 having a pivot ring 39 on the end thereof. The pivot ring 39 is specifically sized and configured for receipt over the pivot member 23 on the traveler, and is rotatable thereabout to angularly adjust the mirror assembly 30 relative to the traveler 20 and post 12. A set screw 35 or other means is used to lock the pivot ring 39 to the pivot member 23, to thereby hold the mirror assembly 30 in the selected adjusted position. By loosening the set screw 35, the mirror assembly 30 can be removed from the traveler 20 for repair, replacement or storage.

While the instant invention has been shown and described in accordance with the preferred and practical embodiments thereof, it is recognized that departures may be made within the spirit and scope of the present invention which, therefore, should not be limited except as set forth in the following claims as interpreted under the doctrine of equivalents.

Now that the invention has been described,

What is claimed is:

1. A trailer hitch alignment device for visually assisting an operator of a towing vehicle in maneuvering the towing vehicle in order to align a first trailer hitch component on a rear of the towing vehicle with a second trailer hitch component on a forwardly extending tongue of a trailer to be towed by the towing vehicle;

said device comprising:

an elongate post having a top end, a bottom end, and a length defined between said top and bottom ends;

means for removably supporting said post on said tongue of said trailer, rearward of said second trailer hitch component so that said post extends upwardly therefrom;

a traveler member removably fitted to said post and movably positionable along said length thereof throughout a range of fixed, adjusted positions, and including clamp means for releasably clamping said traveler member to said post at said fixed, adjusted positions throughout said range, said clamp means including a pair of opposing arm members surrounding a through passage sized and configured for receipt of said post therethrough, said through passage being sized and configured for gripping an external surface of said post with said arm members in a relaxed state, and said passage being expandable to an enlarged state to permit sliding movement of said traveler member along said post; and mirror means attached to said traveler member and pivotally adjustable for positioning said mirror means in a manner which presents a reflected image of said second trailer hitch component to the operator of the towing vehicle to thereby provide a target allowing the operator to maneuver the towing vehicle so that said first trailer hitch component moves toward and into alignment with said second trailer hitch component.

2. A device as recited in claim 1 wherein said means for removably supporting said post includes a socket fixed to said tongue of said trailer, said socket including attachment means for removable, attached receipt of said bottom end of said post therein.

3. A device as recited in claim 2 wherein said attachment means includes magnet means.

4. A device as recited in claim 2 wherein said attachment means includes a set screw threadably fitted to said socket and being threadably operable to engage said bottom end of said post when received within said socket.

5. A device as recited in claim 1 wherein said means for removably supporting said post on said tongue includes a stanchion extending upwardly from said tongue and being structured and disposed for telescopic, sliding receipt of said post therein, said stanchion including lock means for securing said post relative to said stanchion at a plurality of extended positions, to thereby facilitate selective adjustment of a height of said top end of said post relative to said tongue so that said top end can be extended to a position vertically above said second trailer hitch component.

6. A trailer hitch alignment device for visually assisting an operator of a towing vehicle in maneuvering the towing vehicle in order to align a first trailer hitch component on a rear of the towing vehicle with a second trailer hitch component on a forwardly extending tongue of a trailer to be towed by the towing vehicle, and wherein the trailer includes a stanchion extending upwardly from said tongue;

said device comprising:

an elongate post having a top end, a bottom end, and a length defined between said top and bottom ends;

means for removably supporting said post on said tongue of said trailer, rearward of said second trailer hitch component so that said post extends upwardly therefrom, said post being structured and disposed for telescopic, sliding receipt within said stanchion and including lock means for securing said post relative to said stanchion at a plurality of extended positions, to thereby facilitate selective adjustment of a height of said top end of said post relative to said tongue so that said top end can be extended to a position vertically above said second trailer hitch components;

a traveler member removably fitted to said post and movably positionable along said length thereof throughout a range of fixed, adjusted positions, and including clamp means for releasably clamping said traveler member to said post at said fixed, adjusted positions throughout said range, said clamp means including a pair of opposing arm members surrounding a through passage sized and configured for receipt of said post therethrough, said through passage being sized and configured for gripping an external surface of said post with said arm members in a relaxed state, and said passage being expandable to an enlarged state to permit sliding movement of said traveler member along said post; and mirror means attached to said traveler member and pivotally adjustable for positioning said mirror means in a manner which presents a reflected image of said second trailer hitch component to the operator of the towing vehicle to thereby provide a target allowing the operator to maneuver the towing vehicle so that said first trailer hitch component moves toward and into alignment with said second trailer hitch component.

\* \* \* \* \*